United States Patent [19]

Buck

[11] 4,386,716

[45] Jun. 7, 1983

[54] LIQUID MEASURING DEVICE

[75] Inventor: Robert T. Buck, Raleigh, N.C.

[73] Assignee: Becton Dickinson and Company, Paramus, N.J.

[21] Appl. No.: 231,082

[22] Filed: Feb. 3, 1981

Related U.S. Application Data

[63] Continuation-in-part of Ser. No. 72,828, Sep. 6, 1979, abandoned, which is a continuation-in-part of Ser. No. 880,423, Feb. 23, 1978, abandoned.

[51] Int. Cl.³ .................................................. B67D 5/22
[52] U.S. Cl. .......................................... 222/37; 222/38; 222/47; 222/250; 222/134
[58] Field of Search ............... 222/14, 17, 37, 38, 222/41, 42, 47, 49, 63, 71, 249, 250, 134–136, 145, 333; 60/DIG. 1

[56] References Cited

U.S. PATENT DOCUMENTS

| | | |
|---|---|---|
| 1,144,583 | 6/1915 | Brown . |
| 2,348,213 | 3/1944 | O'Shei . |
| 2,687,004 | 8/1954 | Rappl . |
| 2,755,966 | 7/1956 | Lindors .................... 222/250 |
| 2,774,364 | 12/1956 | Brobeil . |
| 2,923,904 | 2/1960 | Hieber ........................ 73/517 R |
| 2,995,451 | 8/1961 | Leach . |
| 3,010,615 | 11/1961 | Smith et al. ..................... 222/333 |
| 3,038,449 | 6/1962 | Murphy et al. . |
| 3,289,889 | 12/1966 | Schwieger . |
| 3,370,759 | 2/1968 | Johansson . |
| 3,813,990 | 1/1974 | Coppola et al. . |
| 4,062,373 | 12/1977 | Clark et al. . |

FOREIGN PATENT DOCUMENTS 617684 7/1978 U.S.S.R. ..................... 222/249

*Primary Examiner*—H. Grant Skaggs

[57] ABSTRACT

The invention is an improved liquid measuring device which can be used as a proportioner, dispenser or flow meter for a single fluid or for an unlimited number of fluids. The device embodies a free-floating piston sealed within a cylinder capped at both ends, a high-resolution detector system, either optical or electrical, to accurately determine the piston location within the cylinder, and a microprocessor which converts the lateral movement of the piston within the cylinder into volume measurements of the fluid in the cylinder.

6 Claims, 6 Drawing Figures

LIQUID MEASURING DEVICE

This application is a continuation-in-part application of Ser. No. 72,828, filed Sept. 6, 1979, and now abandoned which is a continuation-in-part application of Ser. No. 880,423, filed Feb. 23, 1978, now abandoned.

BACKGROUND OF THE INVENTION

1. Field of the Invention

The present invention relates to a liquid measuring device which can be used as a proportioner, dispenser or flow meter for a single fluid or for an unlimited number of fluids. The device embodies a free-floating piston sealed within a cylinder capped at both ends with a high-resolution detector system, totally noninvasive to accurately determine the piston location within the cylinder, such detector being coupled to a microprocessor that allows instant changes in volume measurements and flowrate at the touch of a button.

2. Brief Description of the Prior Art

The prior art does not disclose a device which operates in the same manner as the device of this present invention with the high-resolution detector system to accurately determine the location of a piston sealed within a cylinder.

Brobeil, U.S. Pat. No. 2,774,364, discloses a proportioning and dispensing apparatus and method. Although the apparatus permits proportioning by the stroke of a piston it requires a shaft and seal at the end of a cylinder and only permits adjustment by means of cam switches outside of the cylinder.

Brown, U.S. Pat. No. 1,144,583, discloses liquid measuring apparatus in which the quantity of liquid measured is governed by the size of the cylinder. The piston must move the full length of the cylinder and there is no provision for resolution of a portion of a stroke.

Rappl, U.S. Pat. No. 2,687,004, discloses a fluid pressure accessory system for motor vehicles in which both a positive and a negative pump is used in the actuation of accessories.

Johansson, U.S. Pat. No. 3,370,759, discloses a dispenser which only counts complete strokes of the cylinder but does not contain a high-resolution detector.

O'Shei, U.S. Pat. No. 2,345,213, shows a suction pump connected to a cylinder. Schwieger, U.S. Pat. No. 3,289,889, discloses a multiway valve connected between a cylinder and a source. Leach, U.S. Pat. No. 2,995,451, and Clark, U.S. Pat. No. 4,062,373, disclose separate valves for each of a plurality of sources connected to a common mixing chamber.

Murphy, U.S. Pat. No. 3,038,449, discloses a hydraulic control system incorporating a feedback loop to control flow to a piston enclosed within a chamber. Means are provided for sensing the position of the piston (Col. 3, lines 1–2), and this information is used by a control device to regulate on-off valves controlling pressurized fluid sources (Col. 5, lines 24–37). Movement of the piston is not accomplished by suction or pressure provided by a pump, nor is the Murphy apparatus directed to the proportioning of different fluids as in the present invention.

Coppola, U.S. Pat. No. 3,813,990, discloses a hydraulic actuator system comprising hydraulic positioning means including a hydraulically actuated movable output member (piston), a plurality of servovalves for supplying fluid to said positioning means to position the movable output member, feedback means representative of the position of said output member to establish independent servovalve channels for each of said valves, and means for controlling the servovalves in case of malfunction (Col. 3, lines 37–68, and claim 1).

Both Murphy and Coppola disclose devices which will control the operation of valves using feedback means which sense the position of a piston within a chamber. Neither provides for the movement of the piston when the pump pushes or pulls fluid from the cylinder, nor do they cause the piston to expel liquid from either end of the cylinder as a continuous process. In addition, the proportional combining of fluids is not accomplished by either apparatus.

SUMMARY OF THE INVENTION

The liquid measuring device of the present invention comprises a cylinder closed at both ends with connections at each end for the passage of fluid. A double-acting free-floating piston is sealed within the cylinder and is movable between the first and second ends of the cylinder. A pump feeds fluid into and out of the cylinder. A fluid source includes an on-off input valve for the fluid to be fed into the cylinder. Connected to the pump, both ends of the cylinder and the input valve is a four-way valve which will serve to direct the fluid in the desired direction to move the piston and dispense the fluid. Transducer means, associated with the piston and cylinder, includes an output which is variable with respect to linear displacement, whereby the movement of the piston within the cylinder can be accurately measured with respect to the length of the cylinder. A microprocessor translates the lateral movement of the piston into the volume of liquid within the cylinder. Connections from the microprocessor are provided to actuate the pump, input valve and four-way valve whereby, when the predetermined amount of fluid has been introduced into the cylinder the input valve will be shut off, the piston direction is reversed, and the fluid is dispensed from the cylinder.

DETAILED DESCRIPTION

Figure 1:
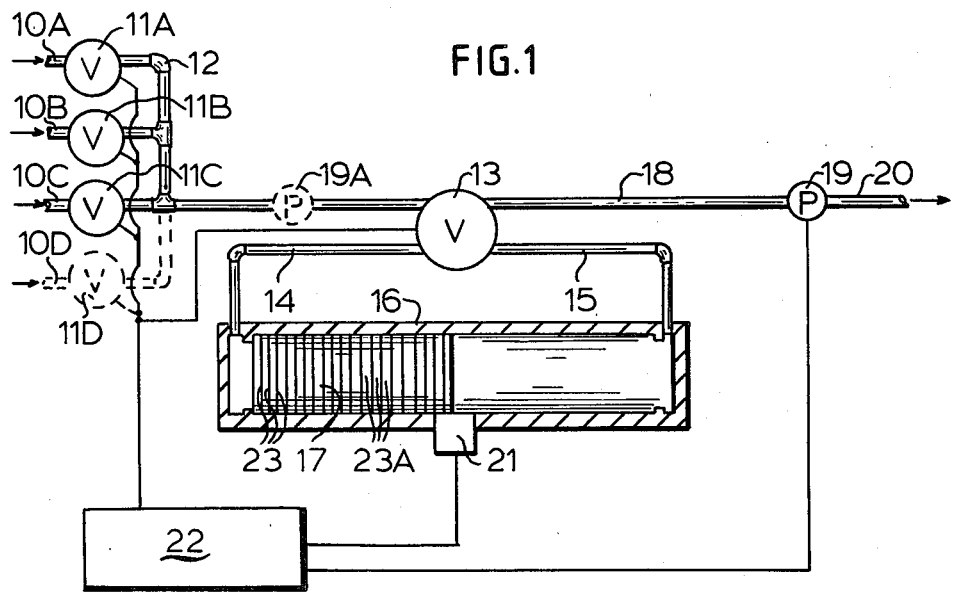
FIG. 1 is a schematic diagram of the device of the present invention.

Referring to the drawings, there is shown in FIG. 1 the various parts of the device of the present invention when used as a fluid proportioner. The fluid sources are designated as 10A, 10B, 10C, 10D, etc. Each source has a separate on-off input valve 11A, 11B, 11C, 11D, etc., depending on the number of fluid sources. Each of these valves is connected to a pipe 12 which is connected to a four-way valve 13. The fluid from its source will be directed from pipe 12 either to pipe 14 or a pipe 15 depending on the setting of the four-way valve 13.

The pipe 14 is connected to a first end of a cylinder 16 whereas the pipe 15 is connected to the second end of the cylinder 16, such cylinder being capped at both ends. The cylinder contains a double-acting free-floating piston 17, which moves backward and forward between the two ends of the cylinder. The cylinder is a completely sealed unit with no seals or connecting rod open to the environment. The unit is electronically infinitely variable and it can be electronically programmed to proportion any number of fluids.

Also connected to four-way valve 13 is a pipe 18 which runs to an output pump 19. Such pump is connected to a suitable outlet 20. The fluid can be directed to the pump and outlet either from the first end of the cylinder through pipes 14 and 18 or from the second end of the cylinder through pipes 15 and 18. The output pump operates through such pipes 14 and 18, or 15 and 18, to create a suction in the cylinder which serves to move the piston in the cylinder.

There is a high-resolution detector system comprising a piston location detector or sensor 21, affixed to the outside of cylinder 16, a microprocessor control 22 coupled to the detector, and means to be sensed by the detector on piston 17 within the cylinder to accurately determine the piston location within the cylinder. The unit is self-calibrating, may have any resolution or precision desired by design and may have proportions or volumes changed by electronic pushbutton. As illustrated, the detector 21 is optical. The piston within the cylinder is alternately striped with reflecting and absorbing surfaces for the wavelength of light emitted by the optical detector, which thus serves as the means which is sensed by the detector for accurately determining the piston location within the cylinder. These alternate stripes 23 and 23a are preferably equally spaced from each other and may be varied in width for any amount of resolution. The optical detector is triggered each time a stripe passes by. This signal is then counted by the electronic microprocessor which has been pre-programmed with the correct number of stripes that are on the piston. The microprocessor then converts the distance the piston has traveled to the volume of liquid displaced. Accordingly, the amount of each fluid desired in the mixture is converted by the microprocessor into a definite number of stripes for each fluid. When the detector optically determines the number of stripes for the particular fluid, for example fluid A, that fluid is shut off and the next fluid is turned on as hereinafter described. The detector feeds information to the microprocessor which electrically operates the on-off input valves, the four-way valve and the pump according to the position of the piston. Such control means may be programmed to proportion the fluids in any combination or quantity at the touch of a button.

The width and spacing of the stipes on the piston and the diameter of the cylinder and piston may be varied according to the exactness of the quantity of fluid desired. If the width and spacing of the stripes are quite narrow and the diameter of the cylinder and piston are small it will be apparent that the detection will be finer and more exact.

The optical detector and the microprocessor are conventional pieces of equipment used to convert lateral movement of the piston into the quantity of fluid introduced into a cylinder of any given size. The microprocessor may include an internal clock and may determine volume vs. time and display a flowrate. The microprocessor also controls the speed of the pump motor so that any flowrate desired can be programmed into the microprocessor.

Placing the generalities discussed above in more specific terms, the microprocessor is essentially a subsystem of electrical components using state of the art technology to effectuate the functions described herein. The microprocessor subsystem is designed to receive, as input signals, information from the optical detector. As pointed out above, the optical detector is triggered each time a stripe on the piston passes same, with the triggered signal being fed to the microprocessor as input. In addition, input from a control panel is directed to the microprocessor. The operator, for instance, will be able to push various buttons on the control panel to select the proportions of the fluids to be introduced into the cylinder. Other parameters such as flowrates of the fluids in or out of the cylinder and total volume control can be inputed from the control panel to the microprocessor.

Output from the microprocessor is directed to the pump to control pump speed, to the input valves of fluid sources for fluid proportioning, to the four-way valve for mixture control and to display readouts on the control panel for such items as total volume dispensed, flowrate and the like.

Internal to the microprocessor, the electrical components include firmware to properly sequence the input valves, the four-way valve and pump speed control so that all of the aforementioned functions can be carried out. This firmware includes elements to convert piston displacement in the cylinder, by virture of the electrical input from the optical detector, to a volume equivalent. Such displacement-volume equivalence can be pre-programmed into the firmware within the microprocessor.

The proportioner operates as follows: initially the four-way valve has been set so that pipe 14 is connected to pipe 18 which has moved the piston to the first end of the cylinder and evacuated the fluid from such first end (FIG. 1). The system has now been initialized and is ready for operation. At this stage, the fluid on-off valves are all closed. The pump is applying suction through pipes 14 and 18 to the first end of the cylinder. The piston is now set to zero with relation to the cylinder.

Figure 2:
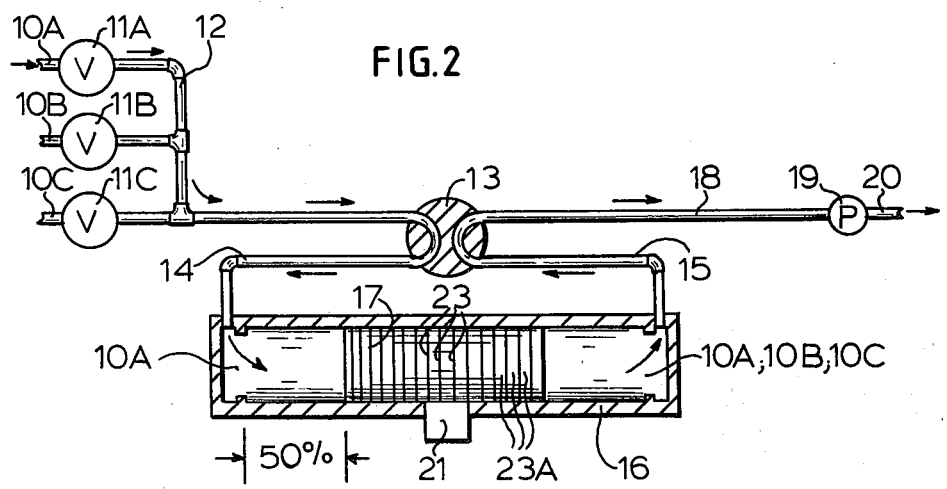
FIG. 2 is a schematic diagram illustrating the flow of the fluids when a first fluid is being drawn into one end of the cylinder and fluids from a previous mixture are being pumped out of the other end of the cylinder.
Figure 3:
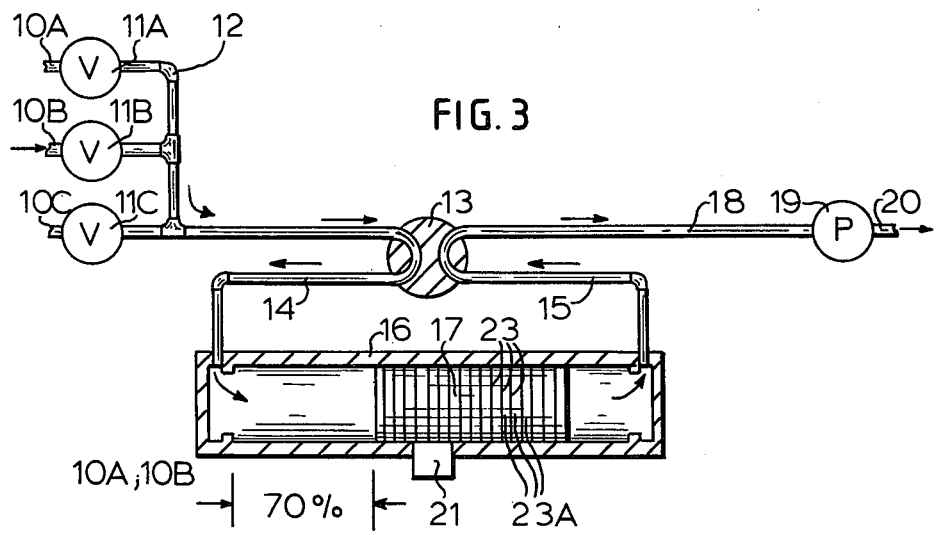
FIG. 3 is a diagram similar to the diagram of FIG. 2 showing a second fluid being drawn into the one end of the cylinder.
Figure 4:
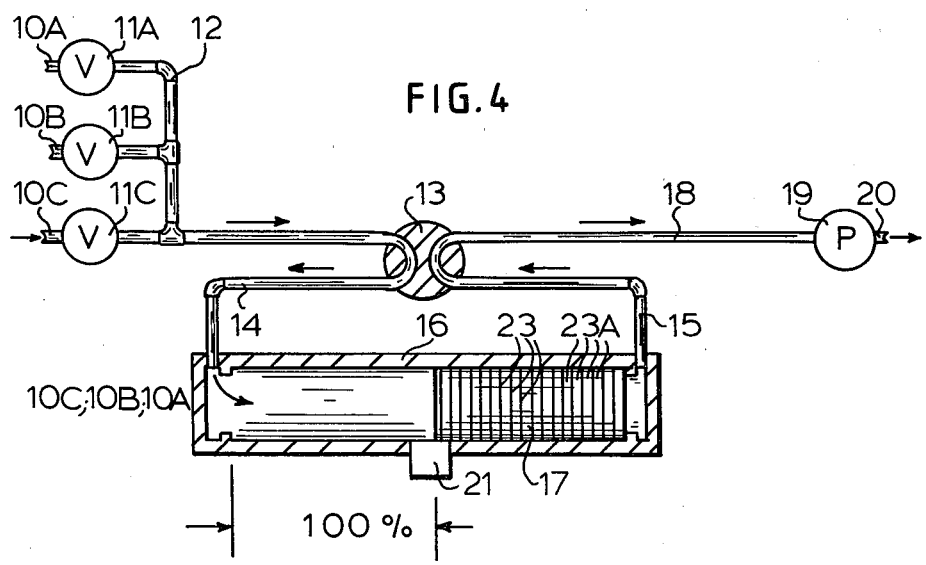
FIG. 4 is a diagram similar to the diagram of FIG. 3 showing a third fluid being drawn into the one end of the cylinder.

The four-way valve is now changed so that pipe 12 is connected to pipe 14 and pipe 18 is connected to pipe 15 (FIG. 2), which applies suction from the pump to the second end of the cylinder and starts the piston moving from the first end of the cylinder toward the second end of the cylinder. At the same time the on-off valve for the particular fluid desired is turned on. For purposes of illustration in FIG. 2, the on-off valve for fluid source 10A is opened. The moving piston draws fluid A through pipes 12 and 14 to the first end of the cylinder. The cylinder keeps moving for a predetermined distance (a certain number of stripes according to the amount of Fluid A desired in the mixture), at which point the control shuts off valve 11A for first fluid A and simultaneously opens valve 11B for the next fluid. For purposes of illustration, the piston has moved fifty percent (50%) of the total distance it can travel in the cylinder, which means that, if the piston moves the full distance in the cylinder, the mixture will contain fifty percent (50%) of fluid A. With valve 11B open, fluid B is drawn into the cylinder to supplement fluid A (FIG. 3). When the piston has moved the predetermined distance, the control shuts off valve 11B and simultaneously opens valve 11C for the next fluid. Again, for purposes of illustration, the piston moves seventy percent (70%) of the total distance it can travel in the cylinder. At this time the cylinder space at the first end will contain fifty percent (50%) of fluid A and twenty percent (20%) of fluid B. The proportioner operates in the same way for fluid C (FIG. 4). This is continued until the piston has traveled its full distance and all fluids have been introduced proportionately into the cylinder. The control then shifts the four-way valve and the process is completed again with the piston reversing direction in the same manner as heretofore described and starting its count up to a precalculated count.

The control circuit may be programmed to introduce any number of fluids for each stroke of the piston, thereby allowing an infinite combination of proportions. Any number of fluids may be used simply by adding an on-off valve to the input of the four-way valve, which is designed to accept a number of spares.

As heretofore described and shown in the drawings, pump 19 is positioned in line 18 so that it pumps fluid to outlet 20. In such case it creates negative pressure or suction in the lines, which serves to pull piston 17. However, it will be understood that such pump can also be positioned ahead of the cylinder in line 12 and create positive pressure in the lines, which serves to push the piston (see 19a in FIG. 1). When pipe 12 is connected to pipe 14 the piston will be pushed from the first end of the cylinder toward the second end of the cylinder, whereas when pipe 12 is connected to pipe 15 the piston will be pushed from the second end of the cylinder toward the first end of the cylinder. The fluids in each case will move as heretofore described.

After the system has been initialized by moving the piston completely into the end of the cylinder, it can thereafter function without the piston moving the full length of the cylinder. The desired volume can then be attained by reaching the precalculated count on the piston. If there is still room in the cylinder such count can be repeated to introduce a like volume into the cylinder. In such case the piston may not have moved the full length of the cylinder. At such stage the piston can be moved in the opposite direction and the desired volume(s) may be removed from the cylinder by the reverse movement of the piston.

As heretofore described and illustrated more than one fluid has been introduced into the cylinder. However, the device of the present invention is equally useful to serve as a flow meter and dispenser for a single fluid. The device is the same as shown in FIG. 1 except that there is only one fluid source, for example 10A with its associated valve 11A connected to pipe 12. As heretofore described, valve 11A is turned off and the system is initialized by moving the piston into one end of the cylinder by the suction from the pump through pipes 14 and 18. Any fluid in the first end of the cylinder will be evacuated as the piston moves to the first end of the cylinder. The counter on the piston is now set to zero. The four-way valve is actuated so that pipe 12 is connected to pipe 14 and pipe 15 is connected to pipe 18 (FIG. 2). Fluid valve 11A is turned on so that fluid flows into the first end of the cylinder. The piston will now move from the first end of the cylinder toward the second end, which will start the count of the stripes by the detector. When the desired amount (units) of fluid has been introduced into the cylinder (precalculated count of the stripes by the detector) valve 11A momentarily is shut off. Valve 11A is then turned on again and another unit of fluid flows into the cylinder, provided there is sufficient space in the cylinder to receive such unit. This operation can be continued as long as there is space in the cylinder for another full unit. When the last unit has been introduced the piston may not have moved completely to the second end of the cylinder. Fluid valve 11A is turned off and the four-way valve is actuated to connect pipe 12 to pipe 15 and pipe 14 to pipe 18 thus preparing the piston to reverse direction, receive fluid in the second end of the cylinder, and dispense the units of fluid in the first end of the cylinder. Valve 11A is now turned on to bring fluid into the second end of the cylinder and pump 19 is turned on. Thus, as each unit of fluid is introduced into the cylinder, a unit of volume is dispensed through pipes 14, 18 and 20. In this manner the cycle repeats itself.

Although the detector was heretofore described as being optical, it will be understood that such detector system can be electrical and function in the same manner. In such case the reflecting and absorbing surfaces of the stripes on the piston and the optical detector will be replaced by a linear variable differential transformer (LVDT) 30 with primary and secondary coils 32 and 34, respectively, and a movable rod 35 embedded within the piston 36. The piston will move within the cylinder 38 and the secondary windings run around the cylinder. As the piston and rod move through the coil the output voltage of the coils will vary with respect to the rod within the piston. This change in voltage is conveyed to the microprocessor preferably through an analog to digital converter to translate the voltage into volume of fluid.

Figure 5:
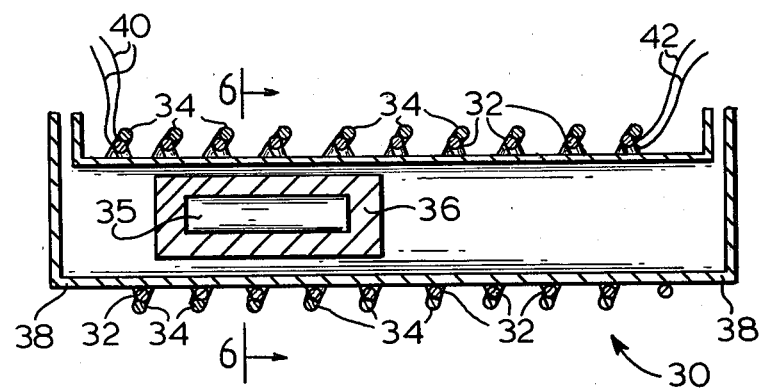
FIG. 5 is a sectional view of an alternate embodiment of the fluid cylinder of the present invention in the form of a linear variable differential transformer.
Figure 6:
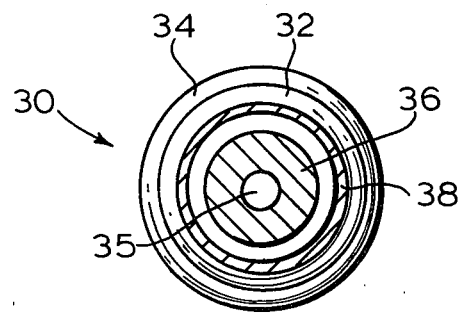
FIG. 6 is a cross-sectional view taken along line 6—6 of FIG. 5.

This type of LVDT is illustrated in FIGS. 5 and 6. It is understood that the LVDT is well-known technology useful in measuring displacement, pressure and force. In the embodiment of the LVDT illustrated in FIGS. 5 and 6, primary coil 32 is excited with a constant voltage (from a source not shown) through input wires 40. Rod 35, preferably metallic, is moved longitudinally from end to end of the coil depending upon the amount of fluid in cylinder 38. This causes a variable voltage output on secondary coil 34 which is proportional to the location of the rod within the coils. This voltage is variable throughout its range. The output voltage from secondary coil 34 is transmitted through output wires 42 to the microprocessor so that this voltage variation can be equated with volume of the fluid in the cylinder.

Thus, the output of the transducer means, whether by the stripes and optical detector or the LVDT will vary according to the linear displacement of the piston within the cylinder.

The advantages of this invention over existing devices include a unit which is self-calibrating, can have any resolution or precision desired by design, which makes it extremely accurate for determining fluid volumes and flowrates, can be readily programmed to perform the functions described herein, and can be readily changed or varied by pushbutton control.

Those skilled in the art will appreciate that many variations of the above-described embodiment of the invention may be made without departing from the spirit and the scope of the invention.

What is claimed is:

1. A liquid measuring device comprising:
    a cylinder having closed input and output ends with
        connections for passage of fluid therethrough;

a double-acting free-floating piston sealed within the cylinder and movable between said ends of the cylinder;

a pump for feeding fluid into and out of the cylinder;

a fluid source having an on-off input valve for the fluid to be fed into the cylinder;

a four-way valve connected to the pump, both ends of the cylinder and the input valve, whereby, depending on the setting of the four-way valve, the pump applies pressure to either end of the cylinder, moves the piston from the input end to the output end of the cylinder and pumps fluid from the output end and whereby, when the input valve for the fluid is open, movement of the piston feeds the fluid into the input end of the cylinder;

transducer means associated with the piston and cylinder having an output variable with respect to linear displacement, whereby the movement of the piston within the cylinder is accurately measured with respect to the length of the cylinder;

microprocessor means for sensing the lateral movement of the piston and forming a representative signal of the volume of liquid within the cylinder; and connections from the microprocessor means to actuate the pump, input valve and four-way valve whereby, when the predetermined amount of fluid has been introduced into the cylinder the input valve is shut off, the piston direction is reversed and the fluid is dispensed from the cylinder.

2. The device of claim 1 wherein the transducer means comprises alternate stripes with reflecting and absorbing surfaces on the piston and an optical detector which emits light of a wavelength to count the stripes as the piston moves past the detector and along the cylinder, whereby the movement of the piston within the cylinder is accurately measured.

3. The device of claim 1 wherein the transducer means comprises a linear variable differential transformer having a rod within the piston and a coil of wires running around the cylinder whereby movement of the piston and rod varies the output voltage from the coil and accurately measures the movement of the piston within the cylinder.

4. The device of claim 1 wherein there is a plurality of sources of different fluids each with an on-off input valve to permit the desired measured volume of each fluid to be introduced into the cylinder to provide a mixture of various proportions of each fluid, whereby, when the desired mixture has been obtained, the input valve is shut off, the piston direction is reversed, and the fluid mixture is dispensed from the cylinder.

5. The device of claim 1 wherein the pump applies negative pressure to the cylinder and draws the piston toward the output end of the cylinder.

6. The device of claim 1 wherein the pump applies positive pressure to the cylinder and pushes the piston toward the output end of the cylinder.

* * * * *